Aug. 10, 1954 L. E. RYALL 2,686,227
ALTERNATING CURRENT SIGNALING RECEIVER
Filed March 5, 1951
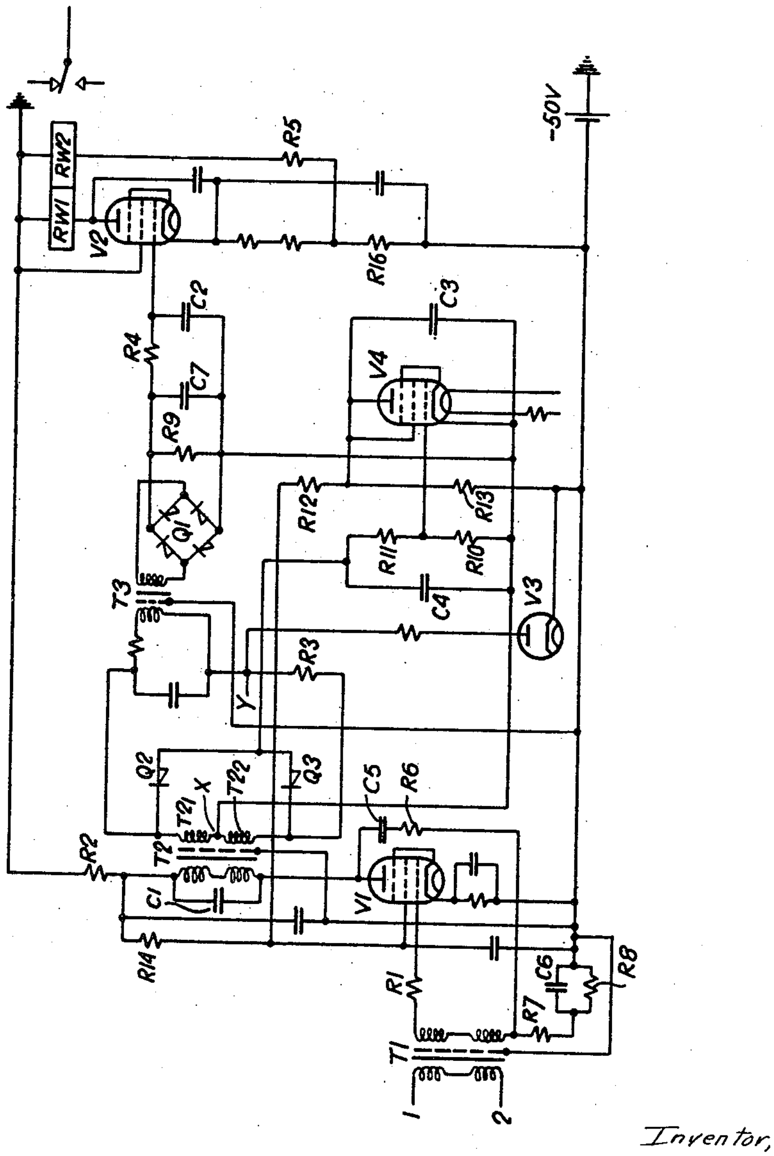
Inventor,
Leonard E. Ryall,
by Hall & Houghton
Attorneys.

Patented Aug. 10, 1954 2,686,227

UNITED STATES PATENT OFFICE 2,686,227

ALTERNATING CURRENT SIGNALING RECEIVER

Leonard Ernest Ryall, Watford, England

Application March 5, 1951, Serial No. 213,965

Claims priority, application Great Britain March 8, 1950

10 Claims. (Cl. 179—84)

This invention relates to alternating current signalling receivers and particularly to voice frequency signalling receivers which are used in telephone transmission circuits. Such receivers must respond to signals of a predetermined frequency, referred to as the signalling frequency, but must not respond to speech signals transmitted over the telephone circuit.

In the past, voice frequency signalling receivers have been designed so that they will select, by means of an electrical filter circuit, signals of signal frequency which are then rectified and amplified if necessary and used to operate a signalling relay or the like. The rectified voltage derived from the signal, referred to as the signal voltage, is normally opposed by a guard voltage which is derived either by rectifying a proportion of the total signal received regardless of frequency or preferably by rectifying signals of all received frequencies other than those at the signal frequency. In general, the guard voltage will be greater than the signal voltage for received speech signals and less for received signals of signal frequency.

So that the receiver may be capable of operation by a signal of signal frequency received in a short time, normally about 20 milliseconds, after the cessation of a signal which may contain certain frequencies other than the signalling frequency, the guard voltage must not persist for a time greater than the 20 milliseconds. The guard voltage must have a short "hang-over" time and any resistor-capacitor combinations across which the guard voltage is built up must have a short time constant. However, the result of this restriction is that when speech signals are received the guard voltage fluctuates and if the speech signal momentarily contains only the signal frequency the guard voltage would be considerably reduced and false operation of the receiver may occur.

It is an object of the present invention to provide an alternating current signalling receiver of improved construction in which the false response of the receiver to speech current containing components at signal frequency is substantially less than known receivers.

According to the present invention an alternating current signalling receiver for converting to direct current impulses operating a signalling relay or the like only received signals of a predetermined frequency which are preceded by an interval during which the level of the received signals is below a predetermined value is provided with means for building up a guard voltage from the received signals only when the level of the latter is greater than the predetermined value and a device for maintaining the guard voltage at its maximum value reached during the reception of signals of a level greater than the predetermined value and which allows the guard voltage to fall to zero when the received signal level falls below the predetermined value.

In one particular form of receiver to which the invention is applied, the guard voltage built up from signals of the predetermined frequency is less than that derived from signals of the same level at other frequencies.

If, in the case of the receiver referred to, the output of a continuously variable frequency oscillator is applied to the input of the receiver and the frequency changed from one which is remote from the signal frequency, and which produces a large guard voltage, to the signal frequency, the large initial guard voltage persists and prevents operation of the receiver but if the received signal is momentarily interrupted, i. e. it drops below the predetermined value, the guard voltage falls to zero and the operation of the receiver follows immediately. As normally signals of signal frequency consist of impulses preceded by a zero signal condition the response of the receiver to signals of the signal frequency is not impaired but response to speech signals containing components at the signal frequency is avoided.

In order that the invention may be more clearly understood and readily carried into effect one form of voice frequency signalling receiver constructed and operating in accordance therewith will now be described by way of example with reference to the accompanying drawing which shows the circuit of the receiver.

The incoming signals are applied to the input terminals 1, 2 of the receiver, and pass via transformer T1 to an amplifying stage comprising valve V1 having a resistor R1 in its grid circuit and a resistor R2 in its anode circuit. These resistors ensure that the output of valve V1 is limited so that it is substantially constant over the normal range of received signal input levels. In addition, negative feedback which determines the guard sensitivity particularly at low frequencies is provided for the amplifying stage from the anode of valve V1 via capacitor C5, resistor R6, resistor R7 and the parallel connected combination of capacitor C6 and resistor R8. The output of the amplifying stage is applied to the primary winding of transformer T2. This primary winding is shunted by a condenser C1 so that harmonics which are produced due to the limiting action when signals of signal frequency are received are thereby shunted and do not increase the guard voltage or adversely affect the operation of the receiver.

The secondary winding of transformer T2 is divided into two equal parts $T2_1$ and $T2_2$ which in combination with the parallel tuned primary of transformer T3 and a resistor R3, form a bridge circuit. The value of resistor R3 is equal to or greater than that of the impedance at resonance of the tuned primary, the resonant frequency of which is equal to the signal frequency. Therefore a minimum output appears between the balance points X and Y of the bridge when a signal of signal frequency is received.

The secondary of the transformer T3 is connected to a bridge rectifier Q1 so that the voltage appearing across the primary of transformer T3 is rectified and charges capacitor C2 via a capacitor-resistor network consisting of resistors R9, R4 and capacitor C7. This network delays the charging slightly to ensure that the voltage across capacitor C2 does not build up quicker than the guard voltage and cause slight transient operation of the receiver. The voltage appearing across the primary of transformer T3 will be a maximum at the signal frequency and this voltage is the signal voltage.

When signals other than signals of signal frequency are received the bridge becomes unbalanced and the voltage appearing across the points X, Y, after rectification by the diode valve V3, charges capacitor C3. The voltage across capacitor C3 is the guard voltage and is in opposition to the signal voltage across C2. The sum of the voltages appearing across capacitors C2 and C3 is applied to the control grid of valve V2.

The main winding RW1 of a polarised relay is connected in the anode circuit of the valve V2. A bias current is fed through the other winding RW2 of the relay and via a resistor R5 to the cathode bias resistor R16 of valve V2 so that under quiescent conditions only a small anode current flows. The relay is operated by the increase in anode current of valve V2 which results when the resultant voltage applied to the control grid of valve V2 becomes positive.

When signals of signal frequency are received the bridge is balanced and the guard voltage developed across capacitor C3 is a minimum and the signal voltage cross capacitor C2 is a maximum. The resultant voltage applied to the control grid of valve V2 causes an increase in anode current and operation of the relay. However, if other signals for example speech signals are received the guard voltage is sufficient to prevent actuation of the relay by any signal voltage derived from the speech currents due to components at signal frequency.

The capacitor C3 across which the guard voltage is developed is of high insulation and can only be discharged through the anode cathode circuit of a multi-electrode valve V4 which has at least one control grid. In order to control the impedance of the circuit, the received signal which appears across windings $T2_1$ and $T2_2$ of transformer T3 is rectified by rectifiers Q2 and Q3 and applied to the resistor-capacitor combination formed by equal resistors R10, R11 and capacitor C4 the negative output of which is tapped at the junction of resistors R10 and R11 and passes to the control grid of the valve V4 and holds the anode-cathode impedance at an infinite value when a signal is being received thus preventing the discharge of capacitor C3. The time constant of the capacitor-resistor combination comprising C4, R10 and R11 is very short i. e. 3 milliseconds, so that as soon as speech or other signals across transformer T2 cease or fall to a sufficiently low level capacitor C4 discharges, valve V4 becomes conducting and discharges capacitor C3. The full wave rectification resulting from the use of rectifiers Q2 and Q3 ensures that a low frequency guard signal can maintain a voltage across capacitor C4, despite its short time constant.

In the quiescent state a small D. C. voltage is derived from the junction of resistors R12 and R13 of the potentiometer resistors R2, R12, R13 and R14 connected across the H. T. supply and is applied to the capacitor C3 so that the anode of valve V2 is positive with respect to its cathode. This ensures that, with zero voltage on the control grid of valve V2 its anode-cathode impedance remains low even when capacitor C3 is discharged to the quiescent value and hence the time to discharge capacitor C3 is very short.

A signal of slightly less value than that required to load the valve V1 provides sufficient negative voltage at the grid of valve V4 to hold the anode-cathode impedance of this valve at an infinite value. Thus the charge of capacitor C3 derived from larger signals received during a previous period is held as these signals provide a negative voltage on the control grid of valve V4 greater than the minimum necessary for infinite impedance. When the received signal ceases or falls below the predetermined minimum value necessary to cause the anode current of valve V4 to be cut off this valve conducts and capacitor C3 is discharged within a few milliseconds.

Thus the receiver is substantially immune from operation by speech currents but it will respond very quickly to signals of signal frequency of only about 3 milliseconds duration provided these are preceded by a drop, of at least 5 milliseconds duration, in the received signal level to below the minimum required to cause the anode current of the valve V4 to be cut off.

It may be desirable to reduce the heater voltage of valve V4 below the normal value to ensure that its anode current is completely cut off when a negative voltage is applied to the control grid. Alternatively, the valve V4 can be replaced by a simple diode in which case the resistor-capacitor combination R10, R11, C4 is connected in series with the cathode so that the voltage developed across the capacitor C4 biases the diode into a non-conducting condition.

Although in the example described, the guard voltage is a minimum at the signal frequency the invention is not limited to receivers having this feature and it may be applied to receivers in which the guard voltage is not frequency dependent. If the guard voltage is not frequency dependent and a signal receiver is used in which the signals are not voltage limited the guard voltage obtained during any period in which the level of speech signal applied to the receiver exceeds that minimum level which prevents the guard capacitor being discharged, then the guard voltage is maintained at the value produced by the maximum instantaneous signal in the speech period. Since the chance of this occurring at the signal frequency is small, greatly enhanced speech immunity is obtained.

It will be seen that the use of a signalling receiver according to the invention permits the use of very short duration signal pulses and this enables an adequate number of signals to be obtained from a single signal frequency system and a multiple signal frequency system is rendered unnecessary for most purposes. The invention is, of course equally applicable to such systems and signals at the multiple signal frequencies can be selected by suitable filter circuits to produce appropriate signal voltages and a common guard voltage, derived from all signals except those of the multiple signal frequencies, is applied in opposition. The simultaneous operation of the signalling relays can then be obtained with signals at the multiple signal frequencies all present together or individual or simple signals can be received.

I claim:

1. An alternating current signalling receiver for converting, to direct current impulses operating a signalling device, selected received signals which comprise only a predetermined frequency and which are preceded by an interval during which the level of the received signals is below a predetermined value, which receiver comprises, in combination, means for deriving said direct current impulses from said selected signals, further means for deriving a guard voltage from the received signals, electrical connections for applying said guard voltage in opposition to said direct current impulses to prevent operation of said signalling device by received signals other than said selected signals, a device for preventing the reduction of said guard voltage from the maximum value reached during the reception of signals of a level greater than said predetermined level and control means for rendering said device inoperative and allowing said guard voltage to be substantially reduced when the received signal level falls below said predetermined value.

2. An alternating current signalling receiver for converting, to direct current impulses operating a signalling device, selected received signals which comprise only a predetermined frequency and which are preceded by an interval during which the level of the received signals is below a predetermined value, which receiver comprises, in combination, means for applying the received signals to an impedance bridge balanced at said pre-determined frequency and unbalanced at other frequencies, a circuit resonant at said predetermined frequency in one arm of said bridge, a first electrical circuit for deriving said direct current impulses from voltages appearing across said resonant circuit, a second electrical circuit for deriving a guard voltage from balance arms of said bridge in its unbalanced condition, a rectifier for said guard voltage, a first capacitor, said rectified guard voltage being applied to charge said first capacitor, the voltage across said capacitor being applied in opposition to said direct current impulses to prevent operation of said signalling device in response to received signals other than said selected signals, a device for preventing the reduction of said guard voltage from the maximum value reached during the reception of signals of a level greater than said predetermined level and control means for rendering said device inoperative and allowing said guard voltage to be substantially reduced when the received signal level falls below said predetermined value, and electrical connections for connecting said device in parallel with said first capacitor.

3. An alternating current signalling receiver for converting, to direct current impulses operating a signalling device, selected received signals which comprise only a predetermined frequency and which are preceded by an interval during which the level of the received signals is below a predetermined value, which receiver comprises, in combination, means for deriving said direct current impulses from said selected signals, further means for deriving a guard voltage from the received signals, a first capacitor, a second capacitor, electrical connections for applying said direct current impulses and said guard voltage to said second and first capacitor respectively, an electrical circuit joining said first and second capacitors so that voltages appearing across them are applied to another electrical circuit to operate said signalling device in response to said selected signals only, a device for preventing a reduction of the voltage across said first capacitor from the maximum value reached during reception of signals greater than said predetermined level and control means for rendering said device inoperative and allowing said guard voltage to be substantially reduced when the received signal level falls below said predetermined value.

4. An alternating current signalling receiver as claimed in claim 3 in which said electrical circuit includes delay means for delaying the application of said direct current impulses to said second capacitor.

5. An alternating current signalling receiver for converting, to direct current impulses operating a signalling device, selected received signals which comprise only a predetermined frequency and which are preceded by an interval during which the level of the received signals is below a predetermined value, which receiver comprises, in combination, means for deriving said direct current impulses from said selected signals, further means for deriving guard voltage from the received signals, a first capacitor, a second capacitor, electrical connections for applying said direct current impulses and said guard voltage to said second and first capacitor respectively, an electrical circuit joining said first and second capacitors so that voltages appearing across them are applied to another electrical circuit to operate said signalling device in response to said selected signals only, an electronic tube in parallel connection with said first capacitor, said electronic tube being normally rendered non-conducting during the reception of signals and control means for rendering said electronic tube conducting so as to discharge said first capacitor when the level of the received signals drops below said predetermined value.

6. An alternating current signalling receiver for converting, to direct current impulses operating a signalling device, selected received signals which comprise only a predetermined frequency and which are preceded by an interval during which the level of the received signals is below a predetermined value, which receiver comprises, in combination, means for applying the received signals to an impedance bridge balanced at said predetermined frequency and unbalanced at other frequencies, a circuit resonant at said predetermined frequency at one arm of said bridge, a first electrical circuit for deriving said direct impulses from voltages appearing across said resonant circuit, a second electrical circuit for deriving a guard voltage from voltages appearing across balance arms of said bridge in its unbalanced condition, a rectifier for said guard voltage, a first capacitor to which said guard voltage is applied, a second capacitor, an electrical delay circuit for applying said direct current impulses to said second capacitor after a predetermined delay, electrical connections between said capacitors for applying the voltages across them to another electrical circuit to operate said signalling device in response to said selected signals only, an electronic tube in parallel connection with said first capacitor, said electronic tube being normally rendered non-conducting and control means for rendering said electronic tube conducting when the level of the received signals drops below said predetermined value so as to discharge said first capacitor.

7. An alternating current signalling receiver for converting, to direct current impulses operating a signalling device, selected received signals which comprise only a predetermined frequency and which are preceded by an interval during which the level of the received signals is below a predetermined value, which receiver comprises, in combination, means for deriving said direct current impulses from said selected signals, further means for deriving a guard voltage from the received signals, electrical connections for applying said guard voltage in opposition to said direct current impulses to prevent operation of said signalling devices by received signals other than said selected signals, a device for preventing the reduction of said guard voltage from the maximum value reached during the reception of signals of a level greater than said predetermined level and control means for deriving from the received signals a control voltage dependent upon the level of said received signals said control voltage being applied to said device to render it inoperative when the level of the received signals falls below said predetermined value, thus allowing said guard voltage to be substantially reduced.

8. An alternating current signalling receiver for converting, to direct current impulses operating a signalling device, selected received signals which comprise only a predetermined frequency and which are preceded by an interval during which the level of the received signals is below a predetermined value, which receiver comprises, in combination, means for deriving said direct current impulses from said selected signals, further means for deriving a guard voltage from the received signals, a first capacitor, a second capacitor, electrical connections for applying said direct current impulses and said guard voltage to said second and first capacitor respectively, an electrical circuit joining said first and second capacitors so that voltages appearing across them are applied to another electrical circuit to operate said signalling device in response to said selected signals only, a device for preventing a reduction of the voltage across said first capacitor from the maximum value reached during reception of signals greater than said predetermined level and control means for deriving from received signals a control voltage dependent upon the level of said received signals, said control voltage being applied to said device to render it inoperative when the level of the received signals falls below said predetermined value, thus allowing said guard voltage to be substantially reduced.

9. An alternating current signalling receiver for converting, to direct current impulses operating a signalling device, selected received signals which comprise only a predetermined frequency and which are preceded by an interval during which the level of the received signals is below a predetermined value, which receiver comprises, in combination, means for deriving said direct current impulses from said selected signals, further means for deriving guard voltage from the received signals, a first capacitor, a second capacitor, electrical connections for applying said direct current impulses and said guard voltage to said second and first capacitor respectively, an electrical circuit joining said first and second capacitors so that voltages appearing across them are applied to another electrical circuit to operate said signalling device in response to said selected signals only, an electronic tube in parallel connection with said first capacitor, said electronic tube being normally rendered non-conducting during the reception and control means for deriving a control voltage from received signals dependent upon the level of the received signals said control voltage being applied to the control grid of said electronic tube to render it conducting when the received signal level falls below said predetermined value.

10. An alternating current signalling receiver for converting, to direct current impulses operating a signalling device, selected received signals which comprise only a predetermined frequency and which are preceded by an interval during which the level of the received signals is below a predetermined value, which receiver comprises, in combination, means for applying the received signals to an impedance bridge balanced at said pre-determined frequency and unbalanced at other frequencies, a circuit resonant at said predetermined frequency in one arm of said bridge, a first electrical circuit for deriving said direct impulses from voltages appearing across said resonant circuit, a second electrical circuit for deriving a guard voltage from voltages appearing across balance arms of said bridge in its unbalanced condition, a rectifier for said guard voltage, a first capacitor to which said rectified guard voltage is applied, a second capacitor, an electrical delay circuit for applying said direct current impulses to said second capacitor after a predetermined delay, electrical connections between said capacitors for applying the voltages across them to another electrical circuit to operate said signalling device in response to said selected signals only, an electronic tube in parallel connection with said first capacitor, said electronic tube being normally rendered non-conducting and control means for deriving control voltage from received signals dependent upon the level of the received signals said control voltage being applied to the control grid of said electronic tube to render it conducting when the received signal level falls below said predetermined value.

References Cited in the file of this patent

UNITED STATES PATENTS

| Number | Name | Date |
|---|---|---|
| 2,145,053 | Meszar | Jan. 24, 1939 |
| 2,282,131 | Hadfield | May 5, 1942 |
| 2,290,570 | Paddle | July 21, 1942 |